June 29, 1965  S. C. OLDENBURGER  3,192,378
RECHARGEABLE LIGHT UNIT
Filed Feb. 27, 1963  3 Sheets-Sheet 1

INVENTOR.
SAMUEL C. OLDENBURGER,
BY
*McMorrow, Berman & Davidson*
ATTORNEYS.

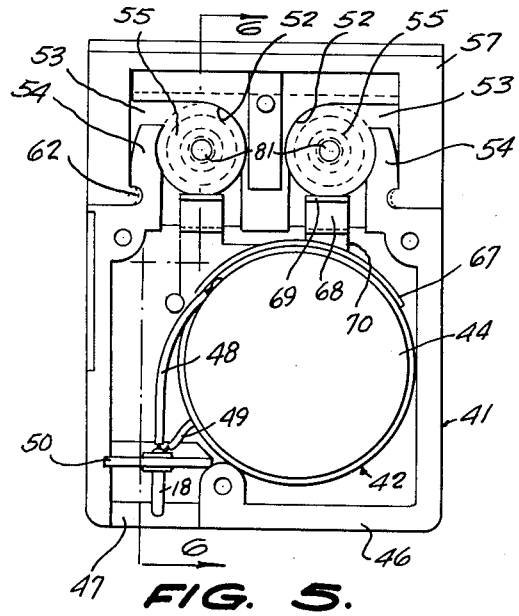

June 29, 1965  S. C. OLDENBURGER  3,192,378
RECHARGEABLE LIGHT UNIT
Filed Feb. 27, 1963  3 Sheets-Sheet 3
FIG. 9.
FIG. 10.
FIG. 11.
FIG. 12.
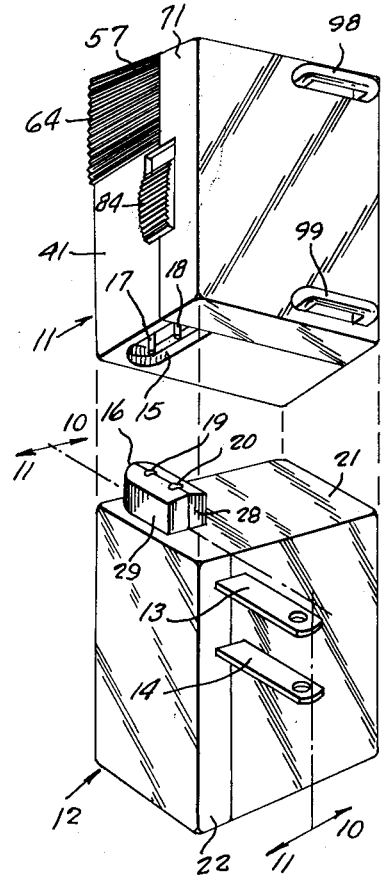
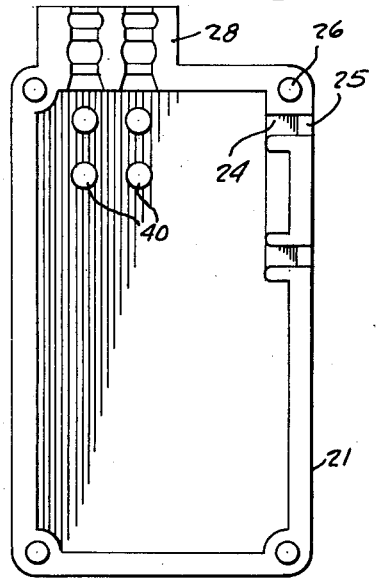
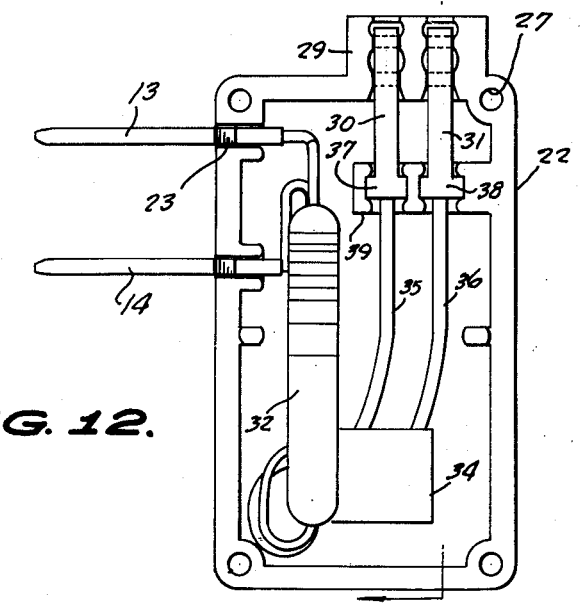
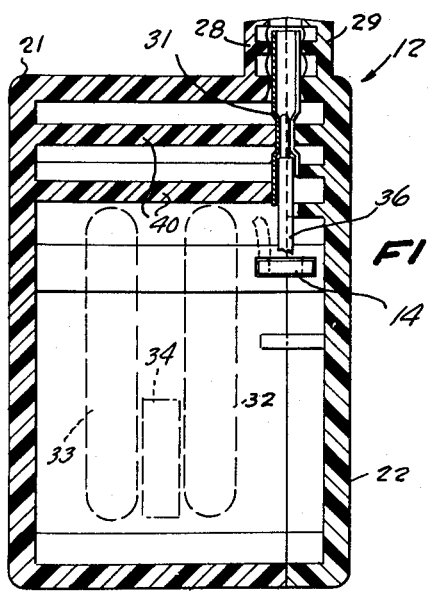
INVENTOR.
SAMUEL C. OLDENBURGER,
BY
McMorrow, Berman & Davidson
ATTORNEYS.

United States Patent Office 3,192,378
Patented June 29, 1965

3,192,378
RECHARGEABLE LIGHT UNIT
Samuel C. Oldenburger, New York, N.Y., assignor, by mesne assignments, to Scovill Manufacturing Company, Waterbury, Conn., a corporation of Connecticut
Filed Feb. 27, 1963, Ser. No. 261,359
8 Claims. (Cl. 240—10.65)

This invention relates to portable electric lighting devices, and more particularly to portable flashlights of the type provided with rechargeable batteries and with means for recharging the batteries when desired.

A main object of the invention is to provide a novel and improved portable electric lighting device of the type provided with rechargeable batteries, and with means for recharging the batteries whenever required, the device being simple in construction, being very compact in size, and providing a highly efficient portable light source.

A further object of the invention is to provide an improved portable flashlight having rechargeable batteries and having a charging unit which may be readily operatively connected to the flashlight to recharge the batteries thereof, the device being inexpensive to manufacture, being durable in construction, and being of sufficiently small size to be easily carried in the user's pocket or purse.

A still further object of the invention is to provide an improved portable flashlight of the type employing rechargeable batteries, the flashlight being provided with a plurality of light bulbs which may be selectively energized so as to provide different amounts of light output, as desired, the device being neat in appearance, being light in weight, and being very economical to operate.

Further objects and advantages of the invention will become apparent from the following description and claims, and from the accompanying drawings, wherein:

FIGURE 5 is an elevational view of the remaining segment of the flashlight, taken substantially on the line 5—5 of FIGURE 3.

FIGURE 6 is a vertical cross sectional view taken substantially on the line 6—6 of FIGURE 5.

FIGURE 7 is a side elevational view, partly in vertical cross section, of the flashlight unit shown in FIGURES 1 to 6, with the bulb-housing segment thereof separated from the remainder of the flashlight unit and disposed in a position to be assembled therewith.

FIGURE 8 is an elevational view similar to FIGURE 4, but showing a modified form of the flashlight unit of the present invention, wherein means is provided for selectively energizing either of the two flashlights bulbs of the unit without physically displacing the bulbs.

FIGURE 9 is a perspective view of the flashlight unit and associated battery recharging unit of FIGURE 1 shown in separated positions.

FIGURE 10 is an enlarged elevational view taken substantially on the line 10—10 of FIGURE 9 and showing the cover segment of the battery recharging unit.

FIGURE 11 is an enlarged elevational view taken substantially on the line 11—11 of FIGURE 9 and showing the remainder of the battery charging unit.

FIGURE 12 is a vertical cross sectional view taken substantially on the line 12—12 of FIGURE 11.

Figure 1:
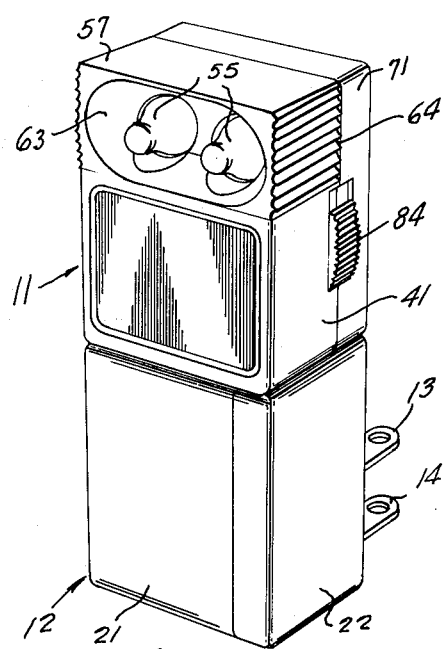
FIGURE 1 is a perspective view of an improved combination flashlight and battery recharging unit, shown in interconnected relationship for charging the battery of the flashlight unit.
Figure 2:
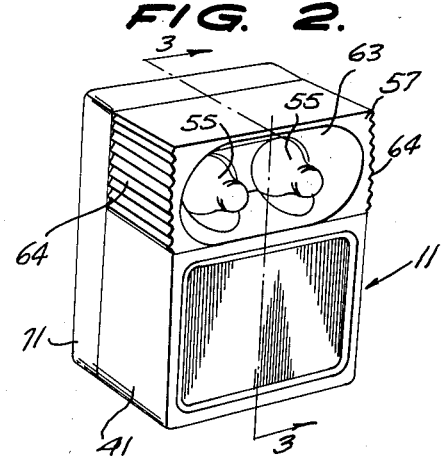
FIGURE 2 is a perspective view of the flashlight unit alone.

Referring to the drawings, 11 generally designates a flashlight unit constructed in accordance with the present invention, said flashlight unit being of the type having a rechargeable battery, and being provided with a cooperating recharging unit, shown generally at 12, the recharging unit having the spaced parallel contact prongs 13 and 14 adapted to be engaged in a conventional electrical outlet.

As will be readily apparent from FIGURES 1 and 9, the prongs 13 and 14 extend laterally from the recharging unit 12, so that the recharging unit will be supported in a vertical position when the prongs 13 and 14 are engaged in an electrical outlet receptacle.

The flashlight unit 11 is provided with a bottom recess 15 adapted to receive and interlock with an upstanding boss 16 on the top of the recharging unit 12, the flashlight unit having the depending contact prongs 17 and 18 engageable in correspondingly spaced apertures 19 and 20 in the upstanding boss 16, so that the flashlight unit 11 will be mechanically interlocked with, as well as electrically connected to the recharging unit 12. Thus, the flashlight unit 11 will be supported on top of the recharging unit 12 in the manner illustrated in FIGURE 1 while the battery of the flashlight unit is being recharged.

As shown in FIGURES 10, 11 and 12, the recharging unit 12 comprises a main housing segment 21 of generally rectangular shape and a cover segment 22 fitting on the rim of the main housing segment, the cooperating elements 21 and 22 being notched to provide clearance for the pair of laterally extending contact prongs 13 and 14, and cooperating to lock the contact prongs in their laterally extending parallel positions shown in FIGURE 11. Thus, the prongs may be notched away at their opposite side edge portions, as shown at 23, and the channels 24 provided therefor in the abutting rim portions of the cover member 22 and the main housing 21 may be provided with transversely extending ribs 25 engageable in the notches 23 of the prongs so as to lock the prongs in their laterally projecting horizontal positions illustrated in FIGURES 9 and 11 when the cover member 22 is secured on the main housing 21 of the recharging unit 12.

To insure accurate registry of the cover 22 with the housing 21, the cover is provided with corner recesses 27 which are engageable by corresponding corner pins 26 provided in the corner portions of the housing 21. The pins 26 may be permanently secured in the recesses 27 by means of suitable cement, or any other suitable fastening means may be employed to secure the cover 22 to the housing 21.

The cover 22 and the housing 21 are formed with the cooperating stud segments 28 and 29 which define the upstanding boss 16 when in abutting relationship, as shown in FIGURE 9. The abutting surfaces of the segments 28 and 29 are suitably recessed to lockingly receive respective contact sleeves 30 and 31 and to secure said sleeves in stationary parallel positions, as illustrated in FIGURES 11 and 12, the sleeves being thus positioned to receive the depending contact prongs 17 and 18 of the flashlight unit 11 when said unit is mounted on the battery recharging unit 12 in the position shown in FIGURE 1.

The prongs 13 and 14 are connected through a pair of voltage dropping resistors 32 and 33 to the input terminals of a suitable bridge-type rectifier 34 of conventional construction. The output terminals of the rectifier 34 are connected by insulated wires 35 and 36 to the respective contact sleeves 30 and 31, as shown in FIGURE 11.

As shown in FIGURE 11, the contact sleeves 30 and 31 have enlarged bottom end portions 37 and 38 which are lockingly engaged in recesses formed in a supporting boss 39 integrally molded with the cover member 22, and the main housing segment 21 is integrally formed with spaced parallel horizontally extending abutment post elements 40 engageable with the respective sleeve elements 30 and 31 at spaced positions thereon, as shown in FIGURE 12, to hold the sleeve elements securely in locking engagement with the recesses in the block 39 when the cover member 22 and the housing member 21 are secured together in interlocked closed positions.

The flashlight unit 11 comprises a generally rectangular main housing segment 41 in which is disposed a conventional rechargeable battery 42, the battery having the respective exposed terminals surfaces 43 and 44 which are insulated from each other by suitable insulating material 45. The bottom wall 46 of the housing segment 41 is formed with an opening 47, and respective insulated lead wires 48 and 49 connect the respective terminal surfaces 43 and 44 to contact pins 18 and 17, said contact pins being mounted in a rigid plate element 50 of insulating material mounted in the housing segment 41 over the opening 47, so that the contact pins 17 and 18 are supported in positions projecting into said opening, as shown in FIGURE 5, namely in positions to engage in the openings 19 and 20 of the upstanding stud element 16 of the battery recharging unit 12 in the manner previously described.

The top wall of the housing segment 41 is integrally formed with an upstanding flange 51, said flange being formed with a pair of side-by-side horizontally directed bores 52, 52 which are open at their upper outer-side portions, as shown at 53, 53 to define generally flexible side wall elements 54, 54. The bores 52, 52 are adapted to receive and frictionally grip respective flashlight bulbs 55, 55 inserted through the bores in the manner illustrated in FIGURE 6, holding the bulbs in fixed positions, but allowing the bulbs to be moved manually forwardly and rearwardly, as will be presently described.

An auxiliary housing block 57 of transparent plastic material is slidably engaged over the flange 51, the transparent block 57 having flexible side walls 58 which are formed at their lower forward corners with inwardly directed locking projections 59, the side walls being the respective opposite sides of a recess or cavity 60 provided in the block 57 and adapted to fit over the flange 51. Said flange is formed with locking recesses 61 at the inner lower portions of its opposite sides, said recesses 61 being adapted to lockingly receive the projections 59 to secure the block 57 on the flange 51, the walls 58 being yieldable outwardly sufficiently to allow the projections 59 to slide in respective guide grooves 62 provided in the side edges of the flange 51, said guide grooves leading to the locking recesses 61.

As shown in FIGURE 6, the transparent block 57 is formed with reflector-simulating arcuately curved recesses 63 in which the head portions of the lamp bulbs 55 are adapted to be positioned when the block 57 is lockingly engaged on the flange 51 in the manner above described.

The respective side surfaces of the transparent block 57 are serrated, in the manner shown at 64, so as to provide a prismatic effect, causing light rays to spread outwardly therefrom in the manner of a prismatic lens, whereby to greatly increase the light diffusing properties of the transparent block 57. The transparent block 57 is so designed that it bends the rays of light upward, backward, downward and sideways, while also cooperating with the bulbs 55 to project a forward spot beam.

Designated at 65 is a metal contact plate which is disposed between the rechargeable battery 42 and the bottom surface of top wall 66 of the housing member 41, the plate 65 being insulated from the battery by a layer of insulating material 67. The contact plate 65 is provided with upstanding fingers 68, 68 which are provided at their top portions with resilient contact portions 69 underlying and engaging the shell portions of the bulbs 55 as is clearly shown in FIGURE 6. Contact plate 65 is provided at its forward end with a depending transversely extending portion 70 which makes conductive contact with the end surface of the terminal casing portion 43 of battery 42.

Figure 3:
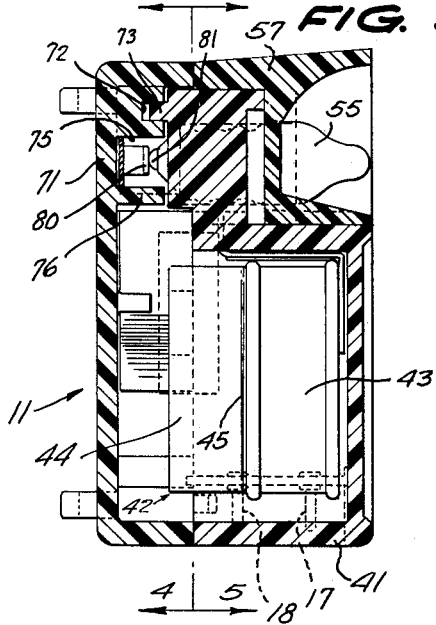
FIGURE 3 is an enlarged vertical cross sectional view taken substantially on the line 3—3 of FIGURE 2.

Designated at 71 is a cover member fitting on and secured to the housing segment 41 in flush relationship therewith and with the transparent block 57, as shown in FIGURE 3. The cover member 71 is formed with locking recesses 72 which receive locking stud elements 73 provided on the housing member 41, said stud elements being tightly received in the recesses 72 for securing the cover member 71 to the housing member 41. If so desired, additional detachable fastening means, such as fastening screws, may be employed to secure the cover member to housing segment 41. However, as will be readily apparent, it is not necessary to employ fastening screws, since the stud elements 73 may be so tightly engaged in the recesses 72 as to hold the assembly in rigidly interconnected relationship.

Figure 4:
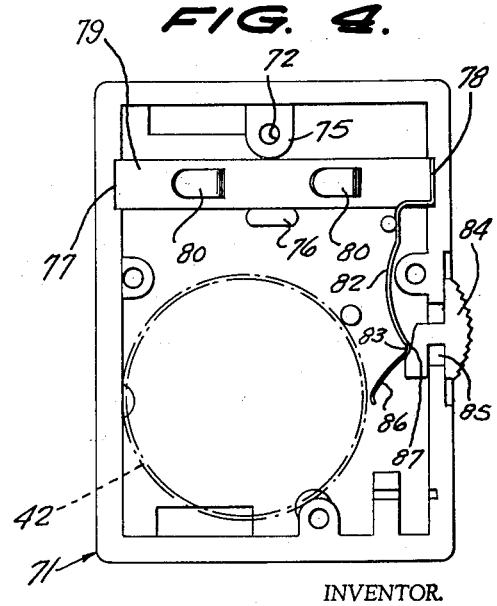
FIGURE 4 is an elevational view of one segment of the flashlight unit of FIGURES 1 and 2, said view being taken substantially on the line 4—4 of FIGURE 3.

The cover member is formed with vertically spaced horizontal lug elements 75 and 76 at its upper intermediate portion and with side recesses 77 and 78, as shown in FIGURE 4, defining a positioning arrangement for receiving a transversely extending vertical spring contact plate 79 and supporting said plate adjacent the center terminals of the bulbs 55, 55, the plate 79 being formed with inwardly struck contact lugs 80, 80 adapted to conductively engage the center terminals 81 of the lamp bulbs as is clearly shown in FIGURE 3.

The conductor plate 79 is formed at one end thereof with a depending resilient finger 82 having a generally V-shaped bend 83 engageable by a vertically slidable switch member 84 mounted in a vertical notch 85 provided in the side wall of the cover member 71, the finger 82 terminating in a resilient contact arm 86 which is engageable with the terminal surface 44 of the battery 42 when bend 83 is cammed inwardly, namely, to the left, as viewed in FIGURE 4, by the upward movement of the switch member 84. Thus, the switch member is provided with the camming surface 87 which is engageable with the bend 83 when the member 84 is pushed upwardly to thereby move the finger 86 into contact with the terminal surface 44 of the battery.

It will be noted that under ordinary conditions, namely, with the center contacts 81 in engagement with the contact lugs 80, upward movement of the switch element 84 to switch-closing position, namely, to the position wherein arm 86 engages the terminal casing 44 of the battery, causes both lamps to be energized simultaneously. If energization of only one lamp is desired, it is merely necessary to pull the other lamp forwardly by grasping its front tip, the flexible arms 54, 54 being sufficiently yieldable to allow such movement of the lamps, whereby the contact 81 of the lamp is disengaged from its associated lug 80. This allows selective energization of either one of the lamps 55, or, if so desired, of simultaneous energization of both lamps.

It will be noted that the bulbs 55, 55 are individually gripped and held in place by the combined clamping actions of the flexible arms 54 and the block 57, which tends to hold the flexible arms in place. The block 57 is formed with a ledge or flange 100 (FIGURE 7) against which the shanks of the bulbs are pressed by the resilient contact portions 69. Contact portions 69 and flange 100 will effectively hold the bulbs in place even if the plastic side spring arms 54 lose their resilience from fatigue or as a result of other adverse conditions.

The arrangement above described is such that two bulbs of different shapes or sizes of shank may be simultaneously used in the device, since the bulbs are independently gripped.

A further advantageous feature of the above described structure is that the periphery of the primary cell 42 forms one of the contact elements of the switch circuit. The other contact element in the switch circuit is the generally L-shaped switch arm having the finger 86 which is pushed into engagement with the periphery of the cell 42 with a wiping action, which tends to clean the mutually contacting surfaces and to keep them free of oxidation. As is clearly apparent from FIGURE 4, the camming surface 87 acts on the bend 83 to push the finger 86 toward the cell 42, causing the arm 82 to become somewhat flattened when finger 86 engages the terminal surface 44 of the cell, whereby finger 86 is caused to slide along said terminal surface with a wiping action.

FIGURE 8 illustrates a modified form of the invention wherein either one or both of the lamps may be energized by progressive upward movement of the slidable switch button element, shown at 84'. In the modified form of the invention shown in FIGURE 8, instead of employing the vertically spaced lugs 75 and 76, shown in FIGURE 4, a single depending vertical lug 90 is employed, said lug 90 being formed with respective notches or grooves 91 and 92 in its side surfaces aligned with and opposing the grooves 77 and 78. Horizontally mounted in the space defined between the depending lug 90 and the left side wall of the cover, designated at 71' in FIGURE 8, is a first spring metal contact plate 79' which is mounted so as to engage the center contact 81 of one of the lamps 55, and horizontally mounted with its ends received in the respective notches 92 and 78 is a second spring contact plate 80' mounted so as to engage the center contact 81 of the remaining lamp 55. The plate 79' is formed with the resilient finger 93 which extends downwardly and which is provided with a resilient arm 94 and formed with a bend 95, as shown in FIGURE 8, said bend being engageable by the arcuately curved camming shoulder 96 of the vertically movable switch button 84'. As will be readily apparent from FIGURE 8, when the button 84' is in its lowermost position, the bend 95 is disengaged sufficiently to allow arm 94 to move away from the terminal casing portion 44 of the battery 42. Upward movement of the switch button 84' to an intermediate position, namely, the position thereof shown in FIGURE 8, flexes arm 94 to the left, as viewed in FIGURE 8, to engage the casing terminal segment 44.

The plate 80' is formed with a depending resilient arm 97 which is engageable by the arcuately curved camming shoulder 96 when the button 84' is pushed to its uppermost position, being thereby moved against the depending portion of flexible arm 93, engaging said depending arm portion and causing arm 94 to simultaneously engage the terminal casing segment 44 of battery 42. This simultaneously connects the center contacts 81 of both lamps 55 to the battery casing segment 44.

As in the previously described form of the invention, the shell portions of the lamp bulbs are electrically connected by the connection plate 65 to the battery terminal casing segment 43. Therefore, when the switch button 84' is moved to its intermediate position, shown in FIGURE 8, one of the lamps becomes energized. Energization of said one of the lamps results from the engagement of the flexible arm 94 with battery terminal segment 44, as above described. To energize both lamps, it is necessary to push the button member 84' to its uppermost position, whereby flexible contact arm 97 engages the depending portion of contact arm 93 and simultaneously moves flexible contact finger 94 into engagement with casing segment 44, as above described. It is thus possible to selectively energize either one or both of the lamps by suitably moving the control button 84'.

The cover segment 71 or 71' is provided with the respective loop members 98 and 99, preferably molded integrally with the cover segment, said loop members being of substantial width and being adapted to receive portions of a suitable supporting strap, not shown, so that the flashlight assembly may be supported on the user's belt or may be mounted on the user's wrist by the use of a suitable wrist strap.

When the battery 42 is to be recharged, it is merely mounted on the battery recharging unit 12 in the manner illustrated in FIGURE 1, namely, by engaging the upstanding stud member 16 in the recess 15 with the pins 17 and 18 received in the openings 19 and 20, and thereby engaging the terminal sleeves 30 and 31, as above described. The recharging device 12 is plugged into a convenient alternating current supply receptacle.

While certain specific embodiments of an improved portable flashlight of the rechargeable battery type have been disclosed in the foregoing description it will be understood that various modifications within the spirit of the invention may occur to those skilled in the art. Therefore, it is intended that no limitations be placed on the invention except as defined by the scope of the appended claims.

What is claimed is:

1. A portable flashlight comprising a main housing segment having a front wall, top and bottom walls, and a pair of side walls, an upstanding projection formed integrally with said top wall and being offset rearwardly from said front wall, a rear cover member secured to said housing segment and upstanding projection, said upstanding projection being formed with a bore extending substantially parallel to said side walls, a flash light bulb frictionally secured in said bore, said bulb having a head portion overlying the forward portion of said top wall, a shell portion extending over said main housing segment, and a rear contact projecting into said cover member, an auxiliary housing member of transparent material, means lockingly securing said auxiliary housing member on said upstanding projection around the bulb head portion, a battery in said housing segment, said battery having respective terminals comprising two casing segments insulated from each other, means connecting one casing segment to the lamp shell portion, a slide switch mounted between the main housing segment and cover member, and means including said slide switch connecting the other battery casing segment to the lamp rear contact.

2. A portable flashlight comprising a main housing segment having a front wall, a top and bottom wall and a pair of side walls, an upstanding projection formed integrally with said top wall and being offset rearwardly from said front wall, a rear cover member secured to said housing segment and upstanding projection, said upstanding projection being formed with a bore extending substantially parallel to said side walls, a flash-light bulb frictionally secured in said bore, said bulb having a head portion overlying the forward portion of said top wall, a shell portion extending over said main housing segment, and a rear contact projecting into said cover member, an auxiliary housing member of transparent material, means lockingly securing said auxiliary housing member on said upstanding projection around the bulb head portion, a rechargeable battery in said housing segment, said battery having respective terminals comprising two casing segments insulated from each other, means connecting one casing segment to the lamp shell portion, a slide switch mounted between the main housing segment and cover member, means including said slide switch connecting the other battery casing segment to the lamp rear contact, said bottom wall being formed with an aperture, an insulating support element secured over said aperture, a pair of spaced depending contact prongs secured on said insulating support element and projecting into said aperture, and respective conductors connecting said prongs to said casing segments.

3. A portable flashlight comprising a main housing segment having a front wall, top and bottom walls and a pair of side walls, an upstanding projection formed integrally with said top wall and being offset rearwardly from said front wall, a rear cover member secured to said housing segment and upstanding projection, said upstanding projection being formed with a bore extending substantially parallel to said side walls, a flashlight bulb frictionally secured in said bore, said bulb having a head portion overlying the forward portion of said top wall, a shell portion extending over said main housing segment, and a rear contact projecting into said cover member, an auxiliary housing member of transparent material, the opposite sides of said upstanding projection being formed with locking recesses, said auxiliary housing member having flexible side walls provided with locking lugs engageable in said locking recess to secure said auxiliary housing member on said upstanding projection around the bulb head portion, a battery in said housing segment, said battery having respective terminals comprising two casing segments insulated from each other, means connecting one casing segment to the lamp shell portion, a slide switch mounted between the main housing segment and cover member, and means including said slide switch connecting the other battery casing segment to the lamp rear contact.

4. A portable flashlight comprising a main housing segment having a front wall, a top wall, a bottom wall and a pair of side walls, an upstanding projection formed integrally with said top wall and being offset rearwardly from said front wall, a rear cover member secured to said housing segment and upstanding projection, said upstanding projection being formed with a bore extending substantially parallel to said side walls, the outer portion of the upstanding projection adjacent said bore being slotted along the length of the bore to define a resiliently yieldable bore wall portion, a flashlight bulb frictionally secured in said bore and clampingly engaged by said yieldable bore wall portion, said bulb having a head portion overlying the forward portion of said top wall, a shell portion extending over said main housing segment, and a rear contact projecting into said cover member, an auxiliary housing member of transparent material, means lockingly securing said auxiliary housing member on said upstanding projection around the bulb head portion, a battery in said housing segment, said battery having respective terminals comprising two casing segments insulated from each other, means connecting one casing segment to the lamp shell portion, a slide switch mounted between the main housing segment and cover member, and means including said slide switch connecting the other battery casing segment to the lamp rear contact.

5. A portable flashlight comprising a main housing segment having a front wall, top and bottom walls, and a pair of side walls, an upstanding projection formed integrally with said top wall and being offset rearwardly from said front wall, a rear cover member secured to said housing segment and upstanding projection, said upstanding projection being formed with a bore extending substantially parallel to said side walls, the outer portion of the upstanding projection adjacent said bore being slotted along the length of the bore to define a resiliently yieldable bore wall portion, a flashlight bulb frictionally secured in said bore and clampingly engaged by said yieldable bore wall portion, said bulb having a head portion overlying the forward portion of said top wall, a shell portion extending over said main housing segment, and a rear contact projecting into said cover member, an auxiliary housing member of transparent material, the opposite sides of said upstanding projection being formed with locking recesses, said auxiliary housing member having flexible side walls provided with locking lugs engageable in said locking recesses to secure said auxiliary housing member on said upstanding projection around the bulb head portion, a battery in said housing segment, said battery having respective terminals comprising two casing segments insulated from each other, means connecting one casing segment to the lamp shell portion, a slide switch mounted between the main housing segment and cover member, and means including said slide switch connecting the other battery casing segment to the lamp rear contact.

6. A portable flashlight comprising a main housing segment having a front wall, top and bottom walls, and a pair of side walls, an upstanding projection formed integrally with said top wall and being offset rearwardly from said front wall, a rear cover member secured to said housing segment and upstanding projection, said upstanding projection being formed with a pair of horizontally spaced transverse bores extending parallel to said side walls, the outer portions of the upstanding projection adjacent the upper portions of the bores being slotted along the length of the bores to define subjacent resiliently yieldable outer bore wall portions, respective flashlight bulbs frictionally secured in said bores and clampingly engaged by said yieldable bore wall portions, each bulb having a head portion overlying the forward portion of said top wall, a shell portion extending over said main housing segment, and a rear contact projecting into said cover member, an auxiliary housing member of transparent material, means lockingly securing said auxiliary housing member on said upstanding projection around the bulb head portions, a battery in said housing segment, said battery having respective terminals comprising two casing segments insulated from each other, means connecting one casing segment to the lamp shell portions, a slide switch mounted between the main housing segment and the cover member, and means including said slide switch connecting the other battery casing segment to the lamp rear contact.

7. A portable flashlight comprising a main housing segment having a front wall, top and bottom walls, and a pair of side walls, an upstanding projection formed integrally with said top wall and being offset rearwardly from said front wall, a rear cover member secured to said housing segment and upstanding projection, said upstanding projection being formed with a pair of horizontally spaced transverse bores extending parallel to said side walls, the outer portion of the upstanding projection adjacent the upper portions of the bores being slotted along the length of the bores to define subjacent resiliently yieldable outer bore wall portions, respective flashlight bulbs frictionally secured in said bores and clampingly engaged by said yieldable bore wall portions, each bulb having a head portion overlying the forward portion of said top wall, a shell portion extending over said main housing segment, and a rear contact projecting into said cover member, an auxiliary housing member of transparent material, the opposite sides of said upstanding projection being formed with locking recesses, said auxiliary housing member having flexible side walls provided with locking lugs engageable in said locking recesses to secure said auxiliary housing member on said upstanding projection around the bulb head portions, a battery in said housing segment, said battery having respective terminals comprising two casing segments insulated from each other, means connecting one casing segment to the lamp shell portions, a slide switch mounted between the main housing segments and cover member, and means including said slide switch connecting the other battery casing segment to the lamp rear contact.

8. A portable flashlight comprising a main housing segment having a front wall, top and bottom walls, and a pair of side walls, an upstanding projection formed integrally with said top wall and being offset rearwardly from said front wall, a rear cover member secured to said housing segment and upstanding projection, said upstanding projection being formed with a pair of horizontally spaced transverse bores extending parallel to said side walls, the upper portions of the upstanding projection adjacent the upper portions of the bores being slotted along the length of the bores to define subjacent resiliently yieldable outer bore wall portions, respective flashlight bulbs frictionally secured in said bores and clampingly engaged by said yieldable bore wall portions, each bulb having a head portion overlying the forward portion of said top wall, a shell portion extending over said main housing segment, and a rear contact projecting into said cover member, an auxiliary housing member of transparent material, the opposite sides of said upstanding projection being formed with locking recesses, said auxiliary housing member having flexible side walls provided with locking lugs engageable in said locking recesses to secure said auxiliary housing member on said upstanding projection around the bulb head portions, a battery in said housing segment, said battery having respective terminals comprising two casing segments insulated from each other, means connecting one casing segment to the lamp shell portions, a multiple position slide switch mounted between the main housing segment and the cover member, means to connect the other casing segment to one of the lamp rear contacts through the slide switch in one position of said switch, and means to connect said other battery casing segment to both lamp rear contacts through the slide switch in another position of said switch.

References Cited by the Examiner

UNITED STATES PATENTS

| 1,346,104 | 7/20 | Boltshauser | 240—10.65 |
| 2,818,498 | 12/57 | Foch | 240—10.66 |
| 3,097,798 | 7/63 | Schmidt et al. | 240—10.66 |

FOREIGN PATENTS 567,128   5/58   Belgium.

NORTON ANSHER, *Primary Examiner.*